(12) United States Patent
Shimamura et al.

(10) Patent No.: US 8,325,872 B2
(45) Date of Patent: Dec. 4, 2012

(54) WORKING DEVICE AND WORKING METHOD

(75) Inventors: Mitsuaki Shimamura, Yokohama (JP);
Takeshi Maehara, Yokohama (JP);
Ikuko Kameyama, Yokohama (JP);
Hiroyuki Adachi, Yokohama (JP);
Yasuhiro Yuguchi, Yokohama (JP);
Toru Taguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 398 days.

(21) Appl. No.: 12/752,783

(22) Filed: Apr. 1, 2010

(65) Prior Publication Data

US 2010/0232562 A1 Sep. 16, 2010

Related U.S. Application Data

(62) Division of application No. 11/270,823, filed on Nov. 10, 2005, now Pat. No. 7,720,190.

(30) Foreign Application Priority Data

Apr. 13, 2005 (JP) .................... 2005-115937
Jun. 13, 2005 (JP) .................... 2005-172315

(51) Int. Cl.
*G21C 17/00* (2006.01)
(52) U.S. Cl. ............... 376/249; 376/260; 376/245
(58) Field of Classification Search ............ 376/249, 376/260, 245
See application file for complete search history.

(56) References Cited

U.S. PATENT DOCUMENTS

| | | | |
|---|---|---|---|
| 5,178,820 A | | 1/1993 | Glass, III et al. |
| 5,193,405 A | * | 3/1993 | Oomichi et al. ............. 73/865.8 |
| 5,787,137 A | | 7/1998 | Nelson, III et al. |
| 5,912,934 A | | 6/1999 | Acks et al. |
| 6,104,772 A | | 8/2000 | Dippel et al. |
| 2003/0227995 A1 | | 12/2003 | Latreille et al. |

FOREIGN PATENT DOCUMENTS

| | | | |
|---|---|---|---|
| JP | 64-39893 U | | 3/1989 |
| JP | 06-072099 U | | 10/1994 |
| JP | 08-086606 A | | 4/1996 |
| JP | 8-226993 A | | 9/1996 |
| JP | 08-240689 A | | 9/1996 |
| JP | 08-282587 A | | 10/1996 |
| JP | 11-014784 A | | 1/1999 |
| JP | 11-174192 A | | 7/1999 |
| JP | 2001-281386 A | | 10/2001 |
| JP | 2001-296385 | * | 10/2001 |
| JP | 2001-296385 A | | 10/2001 |
| JP | 2005-337917 A | | 12/2005 |

* cited by examiner

*Primary Examiner* — Ricardo Palabrica
(74) *Attorney, Agent, or Firm* — Foley & Lardner LLP

(57) ABSTRACT

A working apparatus has: a working equipment for doing works on a structure; a folding/unfolding mechanism for conveying the working equipment to the working position in a folded state; a conveyance mechanism (such as a horizontal thruster) for conveying the working equipment and the folding/unfolding mechanism to the working position; a pressing mechanism (such as a ballast tank) for pressing the working equipment against the lower surface of the structure; and a traveling mechanism including a wheel for traveling along the lower surface of the structure and positioning the apparatus.

2 Claims, 11 Drawing Sheets

146, 46a

WORKING DEVICE AND WORKING METHOD

CROSS REFERENCES TO RELATED APPLICATIONS

The present application is a Divisional of U.S. application Ser. No. 11/270,823, filed Nov. 10, 2005, which is based upon and claims benefit of priority from prior Japanese Patent Application No. 2005-115937, filed Apr. 13, 2005 and Japanese Patent Application No. 2005-172315, filed Jun. 13, 2005, the entire contents of which are incorporated herein by reference.

BACKGROUND OF THE INVENTION

This invention relates to a working apparatus for doing works in a lower part of the inside of a nuclear reactor or the like and a working method of operating such an apparatus.

Intra-nuclear-reactor working apparatus are generally used for intra-reactor operations such as inspections, examinations and preventive maintenances of the inner surface of nuclear reactor pressure vessels (RPVs) and intra-reactor structures. Particularly, when the weld line found in a lower part of the shroud support plate of a lower part of a boiling water nuclear reactor is the target of operation, it is difficult for the intra-nuclear-reactor working apparatus to get to the weld line and the operation faces various problems such as a limited working space and a long working time because it is difficult to access the target that is located in a very narrow area. Various intra-nuclear-reactor working apparatus have been proposed to carry out such an operation in a short period of time and secure a larger working space at a place having access difficulties.

Firstly, an intra-nuclear-reactor working apparatus comprising a remotely operated vehicle (ROV) to be used in water that is equipped with a thruster for moving back and forth and for turning, a thruster for moving up and down and for moving sideways and an underwater camera is known (See, inter alia, Japanese Patent Application Laid-Open Publication No. Hei 11-14784, the entire contents of which being incorporated herein by reference). The apparatus disclosed in the cited reference is provided with an arm mechanism that can be turned and an inspection means selected from an ultrasonic inspection means, a radiation-resistance television camera, an infrared camera and so on is replaceably fitted to the front end of the mechanism.

In this known apparatus, an X-Y scanner mechanism is arranged at the front end of the arm mechanism and any of a various inspection means is fitted to the scanner mechanism. For example, the arm mechanism and the selected inspection means are conveyed to the site of inspection by means of the thrusters of the underwater ROV and the X-Y scanner is pressed near the target of inspection and operated to scan the target by the selected inspection means, utilizing the degree of freedom of operation of the X-Y scanner.

Secondly, a vehicle type mobile body designed to be used as intra-nuclear-reactor working apparatus as described below is known (See Japanese Patent Application Laid-Open Publication No. 2001-296385, the entire contents of which being incorporated herein by reference). This apparatus has a plurality of wheeled arms (cylinder rods) to be extended under the shroud support plate toward the RPV and the shroud support to make the apparatus itself to be preliminarily anchored there. Then, thrusters or the wheels that the mobile body is provided with are driven to move the apparatus to the working site along the periphery. The pressure being applied to the cylinder rods is raised there in order to securely anchor the apparatus.

The apparatus is held in position by the wheels that are pressed by unfolding the work reaction force exerted by the object of work, in other words, the apparatus can hold a large work reaction force. Additionally, it is possible to accurately position the apparatus in a peripheral direction so that the apparatus can be highly reliable in repeated positioning by driving the wheels to travel and move.

VT (visual testing) apparatus realized by mounting an inspection camera on a swimming type vehicle and UT (ultrasonic testing) apparatus realized by combining a swimming type vehicle and an arm to mount a UT probe for the purpose of inspecting weld lines in water located under the shroud support plate in a lower part of the core are known.

It is possible to inspect a broad area in a short period of time in order to efficiently perform an assigned work by using such a swimming type vehicle and auxiliary mechanisms such as arms, because of their mobility and flexibility.

However, preventive maintenance works and welding works involving brush polishing, water washing, water jet peening and/or laser peening encounter a large reaction force in the work, and hence it is difficult to carry out the work by using a swimming type vehicle for conveying objects, positioning itself and holding the position. Additionally, it is difficult for such a swimming type vehicle to move accurately and position itself to give rise to a difficulty in repeated positioning.

On the other hand, a system for unfolding traveling wheels toward the inner wall of a pressure vessel and a shroud support, anchoring itself to a given position and driving thrusters or wheels to move horizontally, can utilize a large reaction force in the work to support itself and move and position itself accurately.

However, when such a system is driven to travel by means of wheels in a peripheral direction of the shroud or the RPV, it can be vertically displaced. It is difficult to prevent or suppress such a vertical displacement.

In view of the above-identified problems of the prior art, it is therefore an object of the present invention to provide a working apparatus and a working method that are adapted to move over a broad range within a short period of time with a limited number of setting operations, withstand a large reaction force and easily position itself repeatedly, moving along a structure in water and positioning itself.

BRIEF SUMMARY OF THE INVENTION

In order to attain the object, according to an aspect of the present invention, a working apparatus for doing works below a structure is provided. The apparatus comprises: a working equipment for doing works; a folding/unfolding mechanism that can be folded when moving the working equipment and unfolded when doing a work; a conveyance mechanism for conveying the working equipment and the folding/unfolding mechanism to the site of the work; a pressing mechanism for pressing the working equipment against the structure; and a traveling mechanism including wheels for traveling under and along the structure and positioning the apparatus.

According to another aspect of the present invention, a working apparatus for doing works on a structure in water is provided. The apparatus comprises: a main body casing including a ballast tank; a working equipment arranged at an upper part of the main body casing so as to be able to project outward by way of a drive mechanism and adapted to do various works on the structure; a float arranged at an upper part of the main body casing so as to be able to project outward by way of a drive mechanism; and wheels arranged at outside of the working equipment and the float and adapted to abut the structure so as to turn the working equipment and the float.

According to another aspect of the present invention, a working method for doing works under a structure is provided. The method comprises: conveying a working equipment and a folding/unfolding mechanism to a working position with the folding/unfolding mechanism held in a folded state; unfolding the folding/unfolding mechanism and setting up the working equipment under the structure after conveying the working equipment and the folding/unfolding mechanism to the working position; pressing the set up working equipment against a lower surface of the structure; moving the working equipment along the lower surface of the structure and positioning it; and doing a work on the structure by means of the moved and positioned working equipment.

According to another aspect of the present invention, a working method for doing works under a shroud support plate arranged between a nuclear reactor pressure vessel and a shroud is provided. The method comprises: removing an access hole cover fitted to an access hole arranged at the shroud support plate; conveying a working equipment under the shroud support plate through the access hole after the cover removing step; and doing a work at a lower part in the nuclear reactor by means of the conveyed working equipment after the conveying step.

DETAILED DESCRIPTION OF THE INVENTION

Now, embodiments of the working apparatus and working method according to the present invention will be described referring to the accompanying drawings. Throughout the drawings, the same or similar components are denoted respectively by the same reference symbols and will not be described repeatedly.

[First Embodiment]

Figure 1:
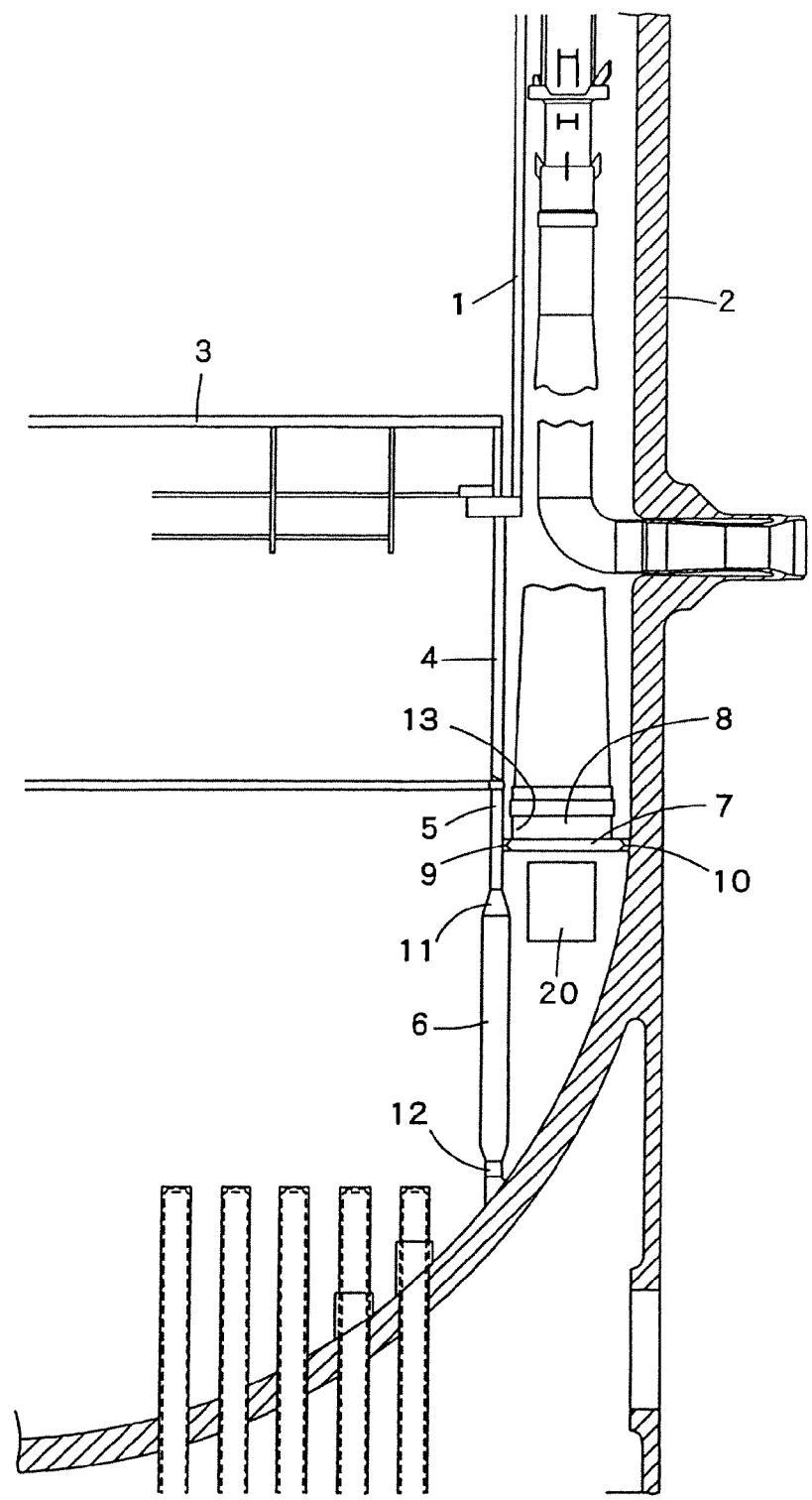
FIG. 1 is a cross sectional view of a first embodiment of intra-nuclear-reactor working apparatus according to the present invention, showing how it is arranged in position.

FIG. 1 is a schematic cross sectional view of the first embodiment of intra-nuclear-reactor working apparatus according to the present invention, showing how it is arranged in position.

Referring to FIG. 1 that illustrates a lower part of a nuclear reactor that is the working site in the nuclear reactor, the site is found in a narrow area located below the shroud support plate 7 and surrounded by the inner wall of the nuclear reactor pressure vessel (RPV) 2, the shroud support cylinder 5 on which a nuclear fuel assemblies are placed, the shroud support legs 6 that are legs of the shroud support cylinder 5, and so on. The shroud support plate 7 is a horizontal annular plate arranged between the shroud support cylinder 5 and the RPV 2.

A large number of weld lines are found in such a narrow area. They include an H8 horizontal weld line 9 that is the weld line connecting the shroud support cylinder 5 and the shroud support plate 7, and an H9 horizontal weld line 10 that is the weld line connecting the RPV 2 and the shroud support plate 7, along with an H10 weld line 11, an H11 weld line 12 and an AD-2 weld line 13.

When conducting various works for these weld lines 9 to 13, such as inspection, polishing, water washing, preventive maintenance and repairing, the inside of the RPV 2 is filled with water and the intra-nuclear-reactor working apparatus 20 is arranged in the water. A cable (not shown) is connected to the intra-nuclear-reactor working apparatus 20 and the other end of the cable is connected to the control section and the operation section of the control apparatus arranged on the operating floor or on the fuel exchanger located above the RPV 2.

Figure 2:
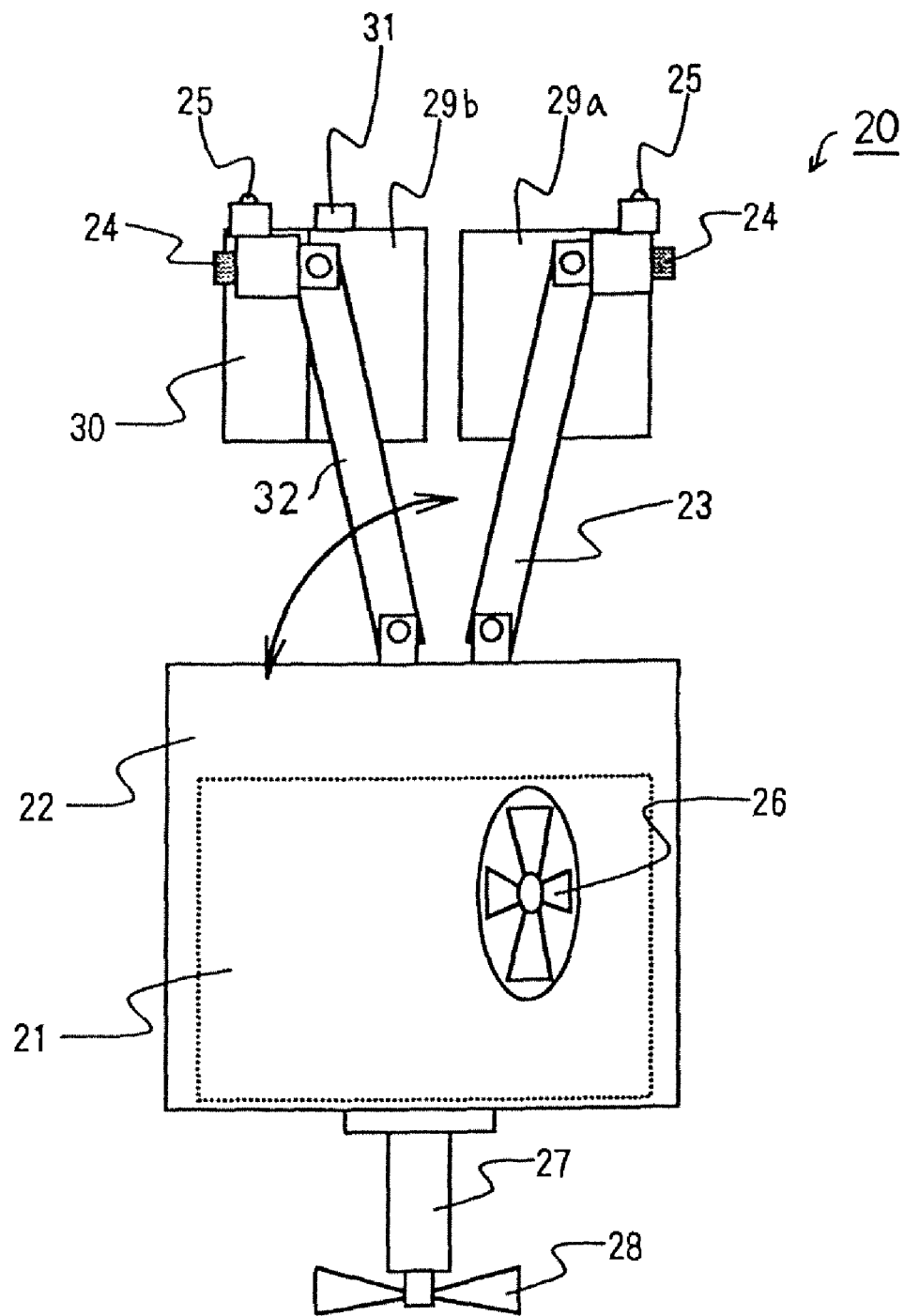
FIG. 2 is a front view of the intra-nuclear-reactor working apparatus of FIG. 1, showing the configuration thereof.
Figure 3:
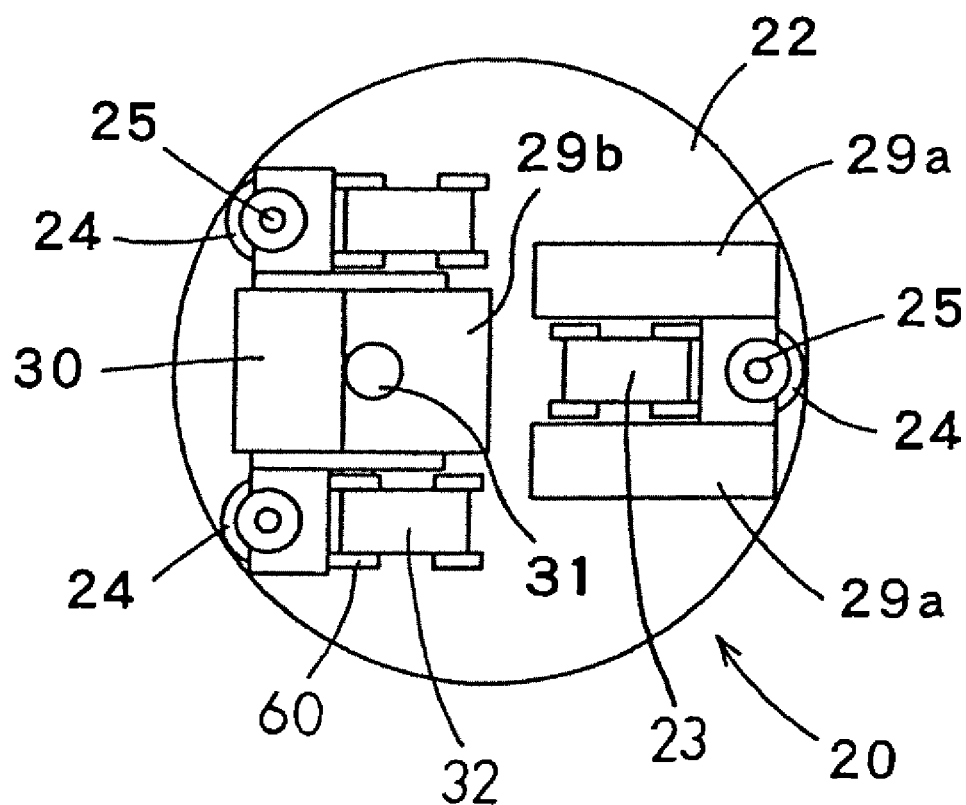
FIG. 3 is a plan view of the intra-nuclear-reactor working apparatus of FIG. 1, showing the configuration thereof.
Figure 4:
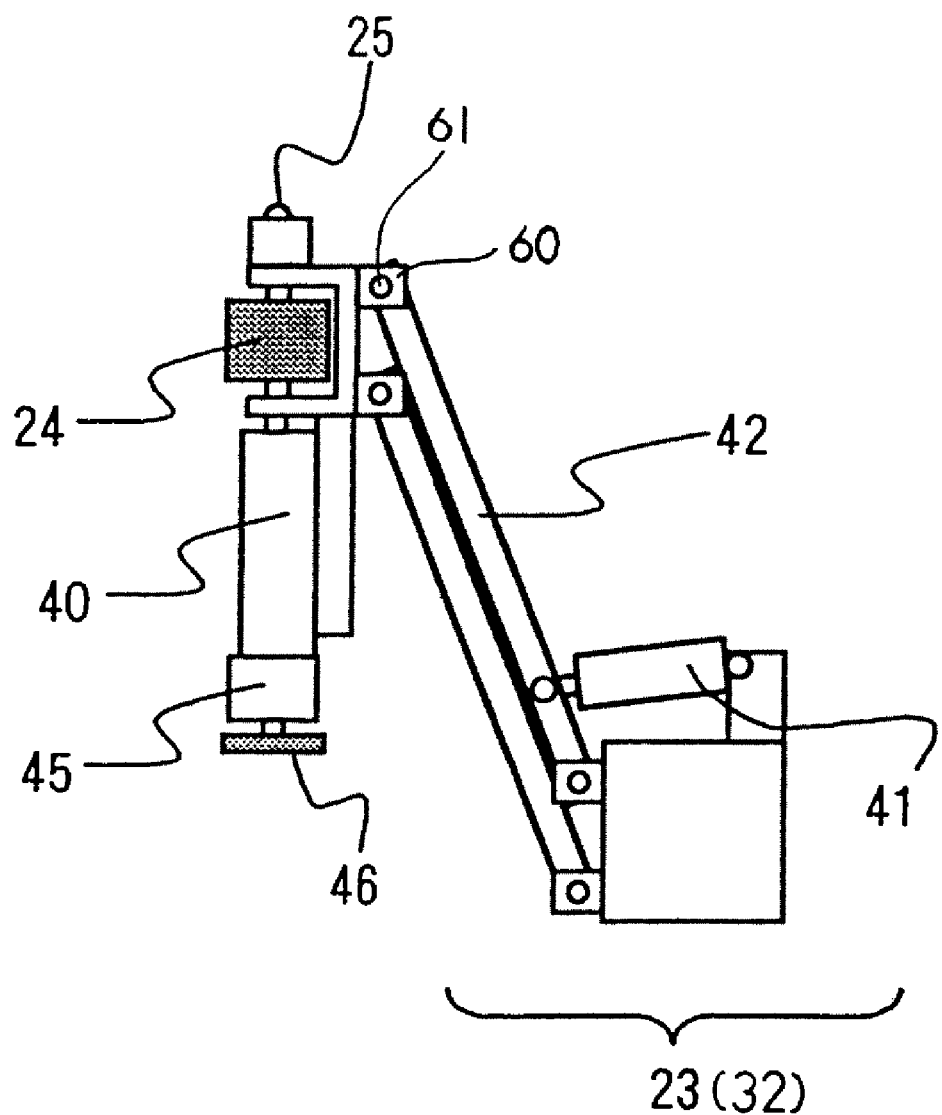
FIG. 4 is a front view of the wheel folding/unfolding mechanism of FIG. 1, showing the configuration thereof.

Now, the intra-nuclear-reactor working apparatus 20 will be described below. FIG. 2 is a front view of the intra-nuclear-reactor working apparatus 20 of FIG. 1, showing the configuration thereof. FIG. 3 is a schematic plan view of the intra-nuclear-reactor working apparatus 20 of FIG. 1, showing the configuration thereof. FIG. 4 is a front view of the wheel folding/unfolding mechanism 32 of FIG. 1, showing the configuration thereof.

As shown in the drawings, the intra-nuclear-reactor working apparatus 20 includes a cylindrical main body casing 22 that contains a ballast tank 21. Wheel folding/unfolding mechanisms 23, 32 for unfolding a working equipment 30 or a traveling wheel 24 are mounted in an upper part of the main body casing 22.

At least three folded traveling wheels 24 to be unfolded are provided. The working equipment 30 is arranged between a pair of traveling wheels 24. Ball casters 25 are fitted respectively to upper parts of the three traveling wheels 24. An original point detection sensor 31 for defining an original point is fitted to an upper part of the intra-nuclear-reactor working apparatus 20. Two vertical thrusters 28 are fitted to a lower part of the main body casing 22 (although only one of them is shown in FIG. 4) so as to be driven by a drive motor 27. Further, two vertical thrusters 26 are fitted to a center part of the main body casing 22 (although only one of them is shown in FIG. 4) so as to driven by a drive motor (not shown).

The main body casing 22 has a cylindrical profile and is dimensionally so designed as to be able to pass through a round hole (not shown) of the reactor core support plate 3. The total height of the intra-nuclear-reactor working apparatus 20 is dimensionally so defined that, after passing through the round hole of the reactor core support plate 3 and moving into a lower part of the reactor, the apparatus 20 can pass among the shroud support legs 6 and move into an area below the shroud support plate 7.

A plurality of floats 29a, 29b are arranged at an upper part of the intra-nuclear-reactor working apparatus 20 so as to position the center of buoyancy above the center of gravity in water even after injecting air into the ballast tank 21 to completely fill the latter with air so that the intra-nuclear-reactor working apparatus 20 can hold its attitude without toppling down in water.

As shown in FIG. 3, at least three wheel folding/unfolding mechanisms 23, 32 are arranged in the intra-nuclear-reactor working apparatus 20. Referring to the drawings, two floats 29a, a wheel 24 and a ball caster 25 are fitted to a single wheel folding/unfolding mechanism 23, whereas a float 29b is sandwiched between a pair of wheel folding/unfolding mechanisms 32, and a wheel 24 and a ball caster 25 are fitted to the front end of each of the wheel folding/unfolding mechanisms 32. The traveling wheels 24 of the wheel folding/unfolding mechanisms 23, 32 are driven by respective wheel drive motors 40 that are directly and coaxially linked to the rotary shafts thereof.

A roller 46 for gauging the distance by which the roller traveled along the outer lateral surface of the shroud and a rotary sensor 45 directly linked to it are fitted to the lower end of each of the wheel drive motors 40. The traveling wheels 24, the rollers 46 and the rotary sensors 45 are linked to the main body casing 22 by way of parallel links 42 in such a way that each of the wheel folding/unfolding mechanisms can be stored in position with the wheel rotary shaft held upright by means of an air cylinder 41. Each of the parallel links 42 is supported at the opposite ends thereof by brackets 60 and pins 61 so as to be able to rotate freely.

The intra-nuclear-reactor working apparatus 20 moves down below the shroud support plate 7 as the wheel folding/unfolding mechanisms 23, 32 are held upright and stored in position. Thereafter, the traveling wheels 24, the rollers 46 and the rotary sensors 45 are pressed against the shroud support cylinder 5 and the inner wall of the RPV 2 by supplying air to the air cylinders 41 to generate traveling drive force in a horizontal direction so that the intra-nuclear-reactor working apparatus 20 can move along the outer peripheral surface of the shroud. At the same time, it is possible to gauge the relative distance by which the intra-nuclear-reactor working apparatus 20 traveled along the outer peripheral surface of the shroud by means of the rollers 46 and the rotary sensors 45 pressed against the outer peripheral surface.

While the driving air cylinders 41 are arranged at an upper part of the main body casing 22 in the illustrated embodiment, drive sources may alternatively be arranged below the ballast tanks 21 for the wheel folding/unfolding mechanisms 23, 32 to produce links that can be unfolded by the drive sources. With such an arrangement, the attitude of the intra-nuclear-reactor working apparatus 20 can be made more stable in water because the center of gravity is lowered by the arrangement.

Figure 5:
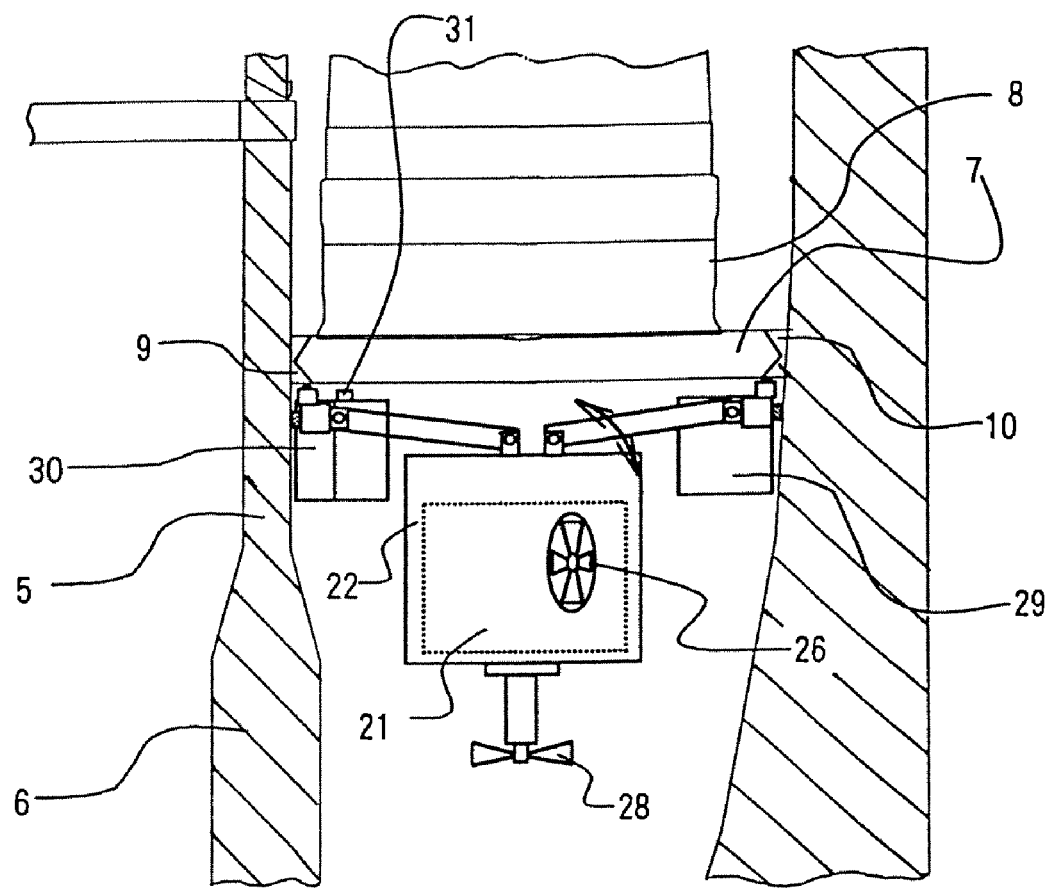
FIG. 5 is a front view of the first embodiment of intra-nuclear-reactor working apparatus according to the present invention, showing how it is operated.
Figure 6:
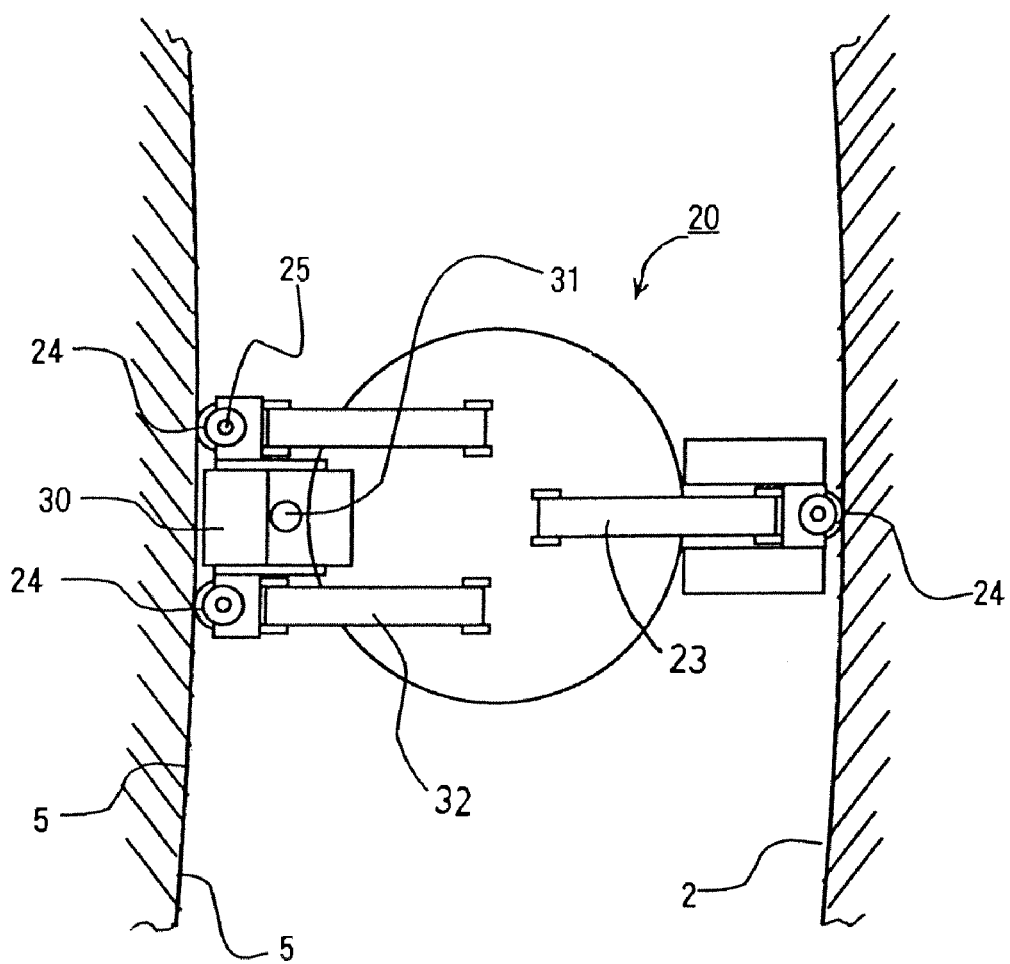
FIG. 6 is a plan view of the first embodiment of intra-nuclear-reactor working apparatus according to the present invention, showing how it is operated.

Now, how the intra-nuclear-reactor working apparatus 20 is handled will be described below. FIG. 5 is a front view of the intra-nuclear-reactor working apparatus 20 of the first embodiment according to the present invention, showing how it is operated, and FIG. 6 is a plan view of the intra-nuclear-reactor working apparatus of this embodiment, also showing how it is operated.

The intra-nuclear-reactor working apparatus 20 is adapted to carry out various operations, for instance, on the H8 horizontal weld line 9 that is the weld line located under the shroud support plate 7 as shown in FIG. 1.

The intra-nuclear-reactor working apparatus 20 is suspended from above the RPV 2 by means of a cable (not shown) and lowered into the RPV 2 that is filled with water. Then, it is moved into a narrow area located in a lower part of the reactor, passing by an upper grid plate and the reactor core support plate 3. At this time, the insides of the ballast tanks 21 are evacuated and water is injected into them to reduce the buoyancy and generate a falling force. At the same time, downwardly propelling force of the vertical thrusters 28 are combined with the falling force to drive the intra-nuclear-reactor working apparatus 20 downwardly in water. Then, the intra-nuclear-reactor working apparatus 20 is made to pass among the shroud support legs 6 and go below the shroud support plate 7.

When driving the intra-nuclear-reactor working apparatus 20 to move, air is injected into the ballast tank 21 or water is discharged from the inside of the ballast tank 21 to make the weight of the entire apparatus substantially equal to 0 kgf in water and drive the apparatus horizontally by means of the horizontal thrusters 26. Then, the working equipment 30 made to face the shroud support cylinder 5 by rotating it around the vertical axis.

Thereafter, the traveling wheels 24 are unfolded until immediately before they touch the outer peripheral surface of the shroud support cylinder 5. Then, air is injected into the ballast tank 21 to expel the water in the inside and lift up the intra-nuclear-reactor working apparatus 20 until the three ball casters 25 touch the lower surface of the shroud support plate 7.

As the vertical position of the intra-nuclear-reactor working apparatus 20 is determined in the above-described manner, the unfolding power is raised to press the traveling wheels 24 firmly against the shroud support cylinder 5 and the inner wall of the RPV 2. For traveling, the traveling wheels 24 are driven to turn, while the ball casters 25 are constantly held in contact with the lower surface of the shroud support plate 7 by the buoyancy generated by the ballast tank 21. Then, as a result, it is possible to move the intra-nuclear-reactor working apparatus 20 horizontally along the H8 weld line 9.

The reference position in a peripheral direction for the H8 horizontal weld line 9, or the original point for traveling, defined by detecting the inner edge of the round hole of the shroud support plate 7 where the jet pump adaptor 8 is rigidly anchored by means of an original detecting sensor 31, which may typically be an ultrasonic distance sensor.

Then, the rollers 46 are made to contact the wall surface to directly gauge the traveled distance by the rotary sensors 45 and computationally determine the traveled relative distance from the original point by the rotary sensors 45. Then, the intended work is carried out by means of an appropriate one of the various pieces of working equipment 30, while remotely regulating the relative position and the attitude of the apparatus relative to the target of work by means of the scanning mechanism. If the work is a visual inspection, a CCD camera is mounted as working equipment 30 and a universal head is mounted as scanning mechanism. Then, the weld line and its vicinity will be continuously shot, while moving the apparatus horizontally and regulating the universal head and the camera angle so as to shoot the desired region.

Alternatively, an ultrasonic flaw detection sensor or an eddy current flaw detection sensor may be mounted with a scanning mechanism having a desired degree of freedom to carry out a similar work.

Any of various works can also be performed for the H9 horizontal weld line 10 by moving so as to make the working equipment 30 face the inner wall of the RPV 2 and unfolding the related components, following a similar sequence of operation.

With this embodiment, it is possible to perform a preventive maintenance operation or a welding operation such as an inspection, a cleaning operation, a polishing operation, water washing, water jet peening and/or a laser peening operation to a weld line that is found in a hard-to-be-accessed area below the shroud support plate 7 when conducting any of various operations on the intra-reactor structures in the nuclear reactor pressure vessel that is immersed in water in a nuclear reactor.

Additionally, the working apparatus can cover a wide area with a limited number of times of immersions of installations to carry out works efficiently.

Still additionally, since the traveling wheels 24 are unfolded and pressed against a wall, it is possible to support a large reaction force and hence carry out a work stably.

Furthermore, since the intra-nuclear-reactor working apparatus can continuously travel on the outer wall surface of the shroud support cylinder 5 by means of the traveling wheels 24, it is possible to accurately and continuously position the apparatus and restore the apparatus to an original position. Thus, it is possible to improve the quality of the work it carries out. Sine the intra-nuclear-reactor working apparatus can move along the lower surface of the shroud support plate 7 by utilizing buoyancy, the vertical position of the apparatus can be reliably secured to further improve the quality of the work it carries out.

The working equipment 30 is selected from a brush for polishing operations, a grinding jig, a washing water nozzle, a water jet peening head for preventive maintenance, a laser peening head and a welding head for repairing works and mounted in the intra-nuclear-reactor working apparatus.

Thus, by using any of these pieces of working equipment 30, it is possible to perform polishing operations, cleaning operations, operation for improving stresses as preventive maintenance and repairing operations.

Therefore, with this embodiment, it is possible to perform, in addition to inspection, polishing operations, cleaning operations, operation for improving stresses as preventive maintenance and repairing operations on the weld lines located in a narrow area under the shroud support plate which is difficult to access.

In this embodiment, the conveyance mechanism of the intra-nuclear-reactor working apparatus is realized by the two horizontal thrusters 26 and by regulating the buoyancy of the ballast tank 21.

More specifically, the embodiment is driven to move up and down respectively by the rising power and the falling power generated by the ballast tank 21. It is driven to move horizontally and turn around a vertical axis by the propelling force of the horizontal thrusters.

This embodiment provides improved handling capabilities because the degree of freedom of driving and the number of cables are reduced. Additionally, it is possible to make the intra-nuclear-reactor working apparatus 20 submerge and surface or become pressed against the lower surface of the shroud support plate with a simplified structure.

In this embodiment, preferably the traveling wheels 24 are rubber wheels having a shape of a truncated cone that are fitted in position with the larger diameter side facing downward. With this arrangement, it is possible to apply an upwardly displacing force to the apparatus as the traveling wheels 24 are pressed against a wall surface and driven to rotate.

Then, along with the buoyancy of the ballast tank, it is possible to firmly press the apparatus against the lower surface of the shroud support plate so that the apparatus can securely move horizontally along the shroud support plate.

[Second Embodiment]

Figure 7:
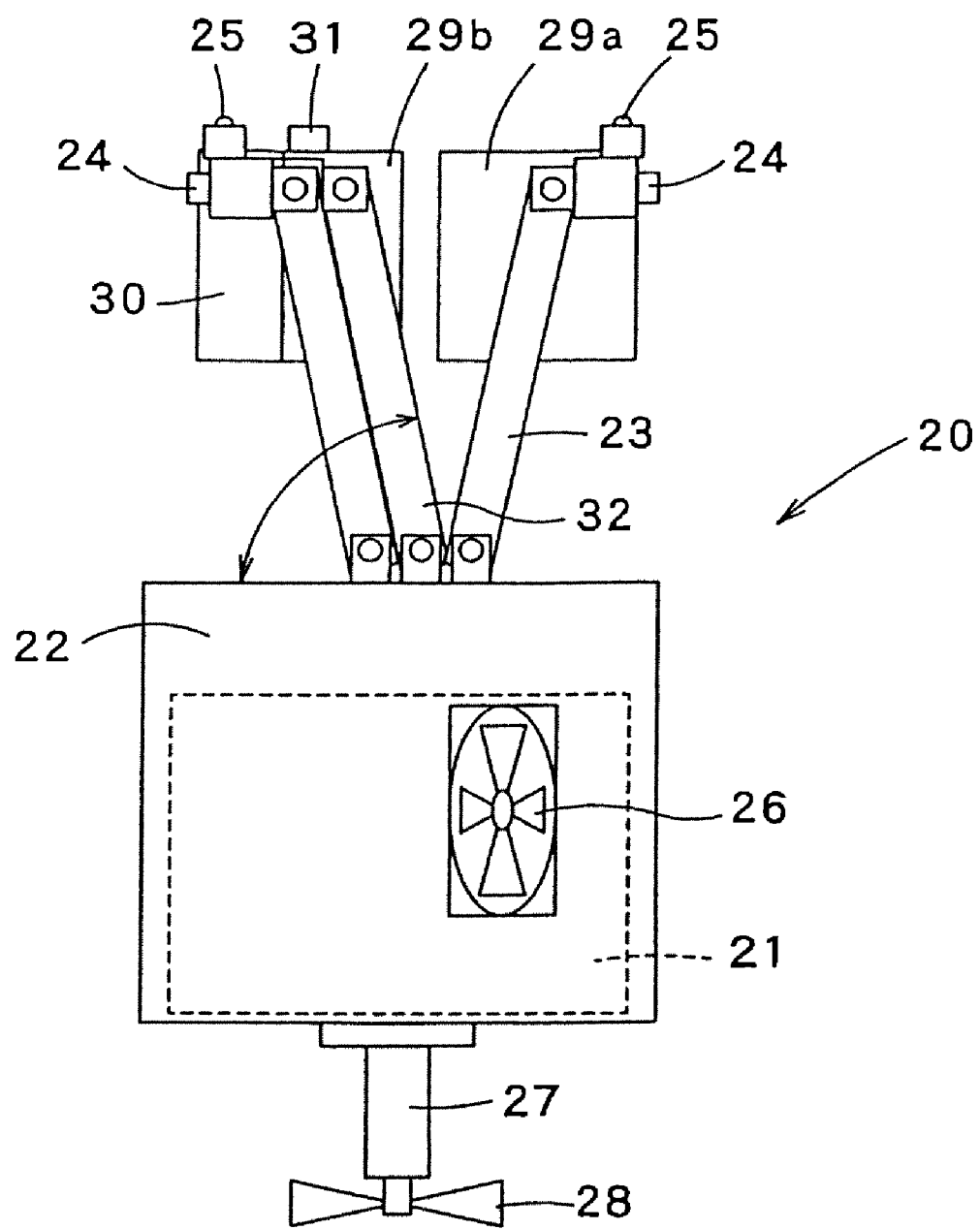
FIG. 7 is a front view of a second embodiment of intra-nuclear-reactor working apparatus, showing the configuration thereof.

FIG. 7 shows the second embodiment of intra-nuclear-reactor working apparatus according to the present invention. The components of this embodiment that are same as or similar to those of the first embodiment are denoted respectively by the same reference symbols and will not be described in detail any further.

This embodiment differs from the first embodiment illustrated in FIG. 2 in that the drive mechanism 32 for supporting the working equipment 30 and the float 29b includes two links that are arranged adjacently in a horizontal direction. Otherwise, this embodiment is identical with the first embodiment.

[Third Embodiment]

Now, the third embodiment of the present invention will be described below by referring to FIGS. 8 and 9. The components of this embodiment that are same as or similar to those of the first embodiment are denoted respectively by the same reference symbols and will not be described in detail any further.

Figure 8:
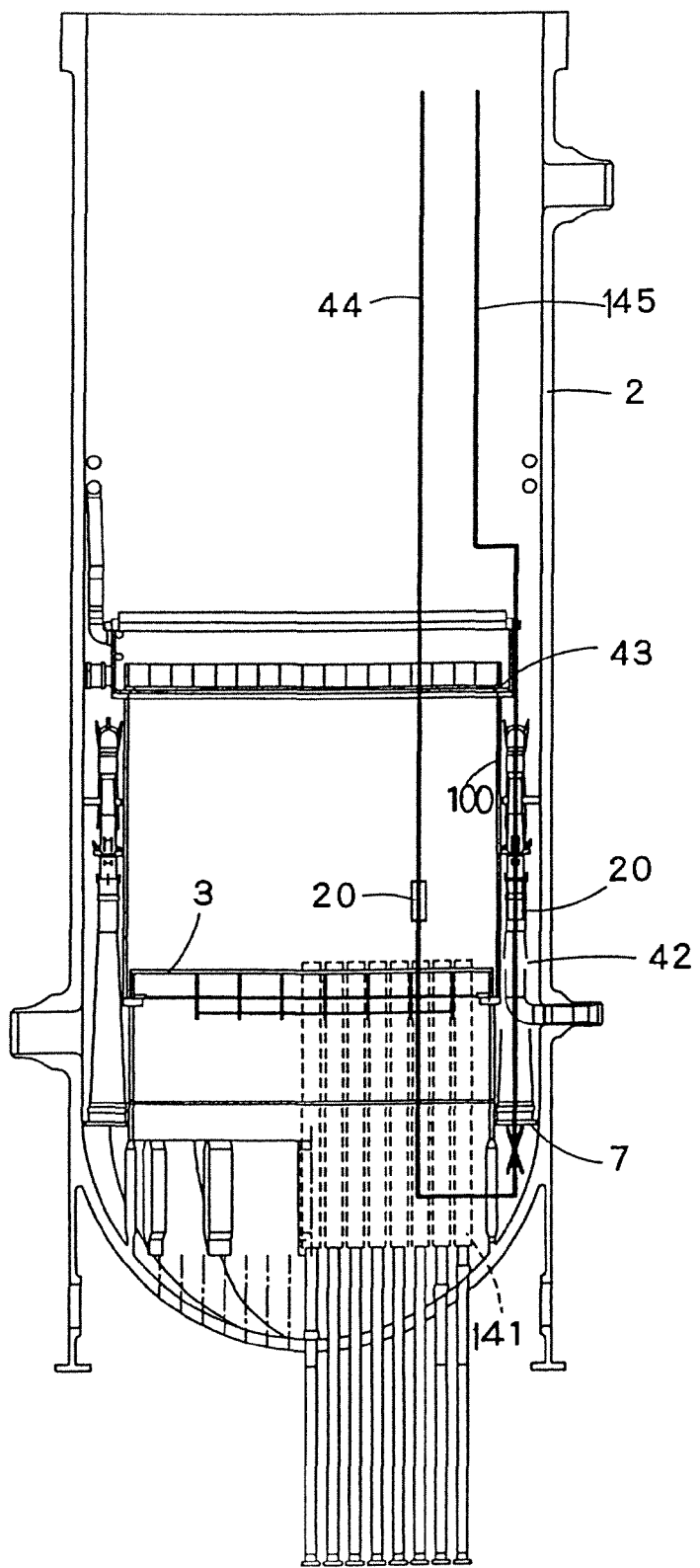
FIG. 8 is a schematic cross sectional view of a third embodiment of the present invention, conceptually showing access routes for accessing a lower part of the shroud support plate in a nuclear reactor.
Figure 9:
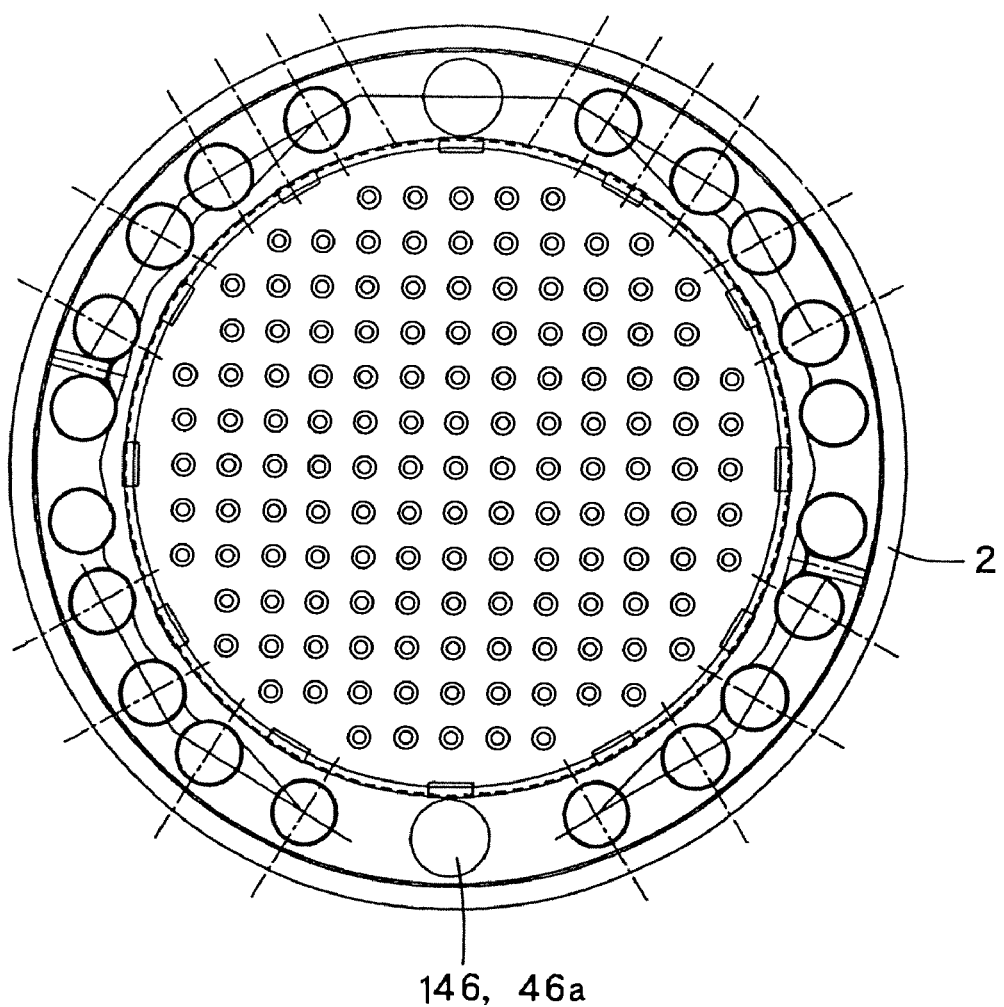
FIG. 9 is a schematic cross sectional plan view of the third embodiment of the present invention, conceptually showing the access hole covers and the positions of the access hole covers.

As shown in FIGS. 8 and 9, an upper grid plate 43 having an opening and a reactor core support plate 3 having an opening are arranged in the pressure vessel 2. The intra-nuclear-reactor working apparatus 20 is led to an area located under the shroud support plate 7 by way of either of two routes 44, 145, one for accessing the area under the shroud support plate 7 from the inner surface side of the shroud 100, passing through the opening of the upper grid plate 43 and the opening of the reactor core support plate 3, and one for accessing the area under the shroud support plate 7 from the outer surface side of the shroud 100, passing through the access hole 46a.

This embodiment can carry out any of various works on the intra-nuclear-reactor structures in the pressure vessel 2 that is immersed in water in a nuclear reactor regardless of the intra-nuclear-reactor environment. More specifically, it can be used to carry out any of various works on the H8 horizontal weld line 9 that is the weld line of the shroud support cylinder 5 and the shroud support plate 7, the H9 horizontal weld line 10 that is the weld line of the pressure vessel 2 and the shroud support plate 7, the H10 weld line 11 that is the weld line of the shroud support legs 6 and the shroud support cylinder 5, the H11 weld line 12 that is the weld line of the shroud support legs 6 and the pressure vessel 2, the AD-2 weld line 13 that is the weld line of the jet pump 8 and the shroud support plate 7.

For instance, if all the control rod guide tubes 141 and the fuel are installed and it is not possible to take the access route 44 leading to an area under the shroud support plate 7, it is possible to take off the access hole cover 146 and take the access route 145.

Figure 10:
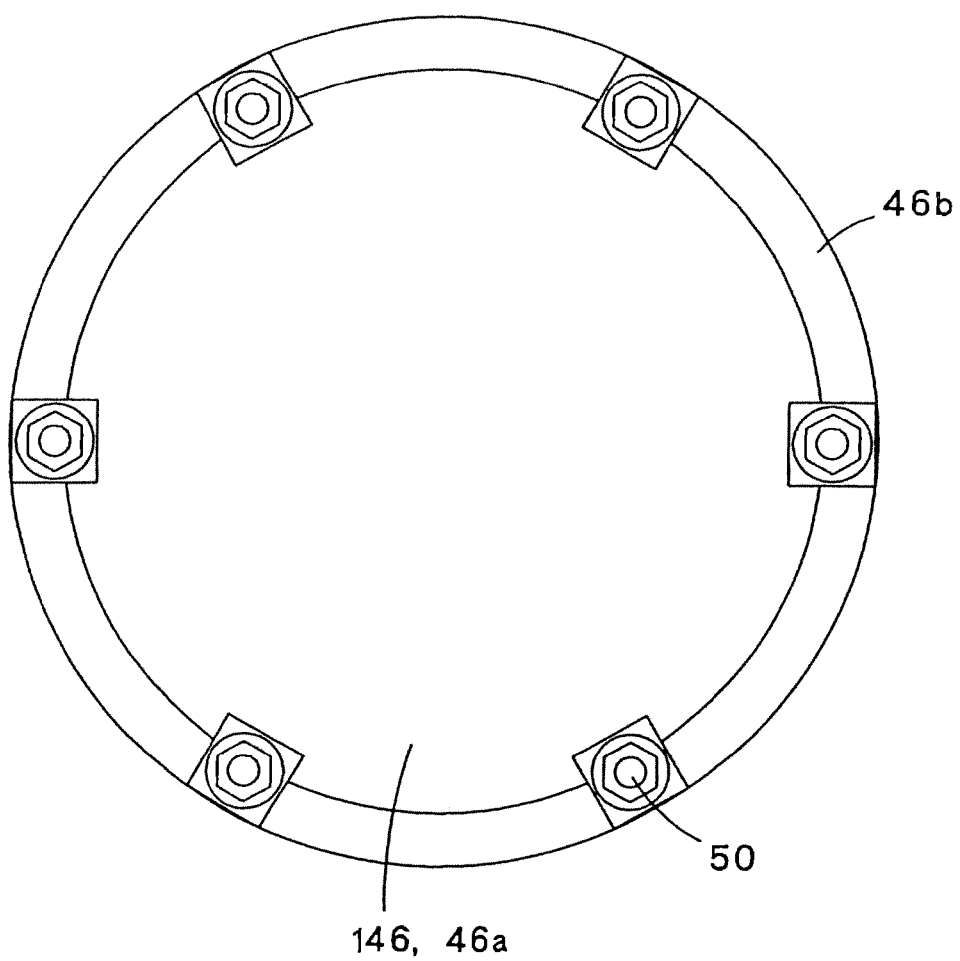
FIG. 10 is a plan view of the access hole cover of the third embodiment of the present invention.
Figure 11:
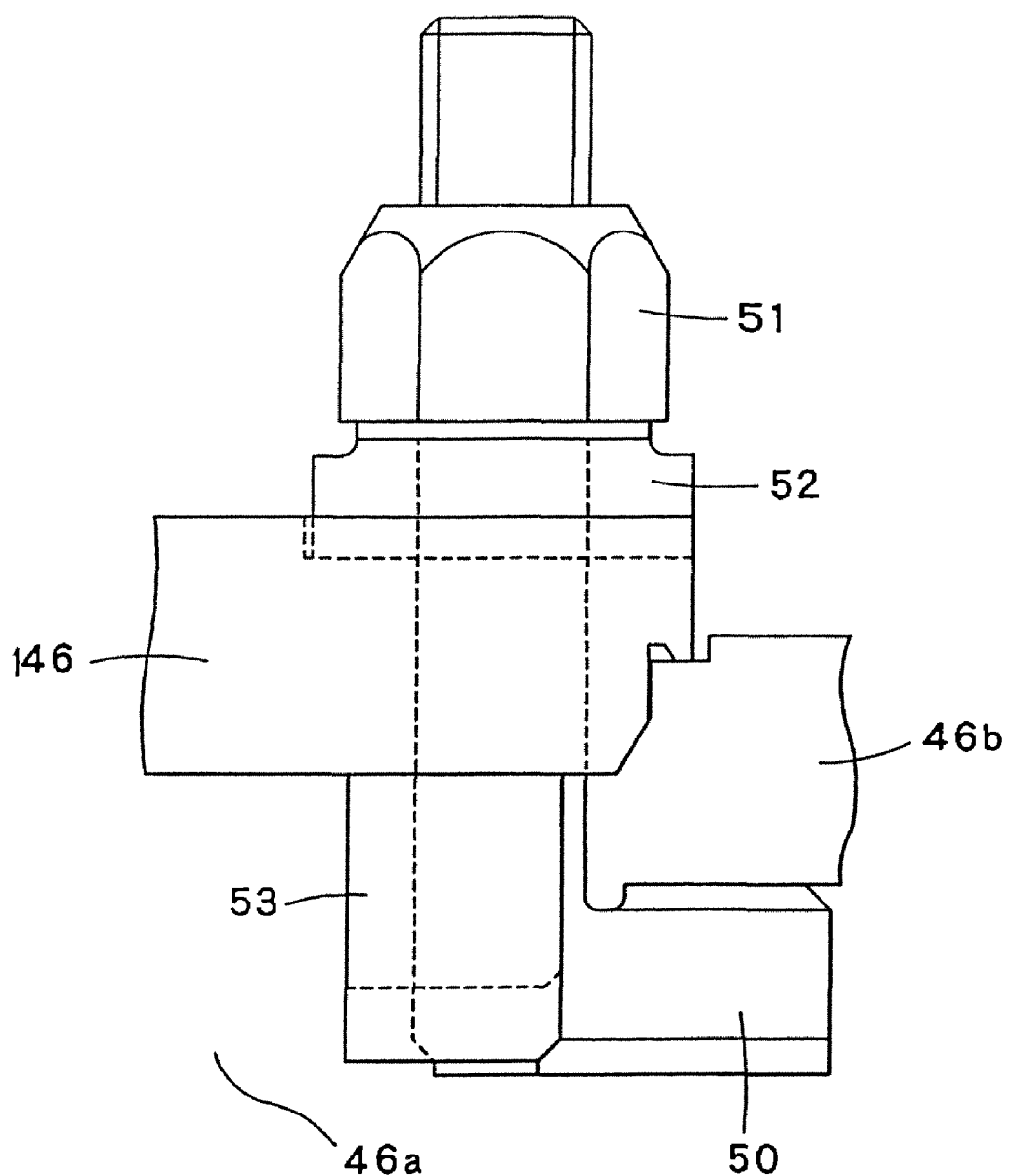
FIG. 11 is an elevational view of a bolt for anchoring the access hole cover of the third embodiment and its vicinity.

As shown in FIGS. 10 and 11, the access hole 46a arranged in the pressure vessel 2 is covered by the access hole cover 146. The access hole cover 146 is rigidly secured to the peripheral edge 46b of the access hole 46a by means of a total of six bolts (binding sections) 50 and a retainer 52 is arranged between the access hole cover 146 and each of the nuts 51.

Each of the bolts 50 is engaged with a nut 51 and the stoppers 53 that operate as anti-revolution means are formed by using spring mechanisms. Thus, the bolts 50 can be fitted and removed with ease.

Since the stopper 53 of each of the bolts 50 is formed by using a spring mechanism 53, the access hole cover 146 can be fitted and removed with ease by means of a handling jig that is exclusively designed as anti-revolution key. With this arrangement, it is possible to easily carry out operations including inspections, polishing, washing with water, water jet peening, laser peening for preventive maintenance, and repairing operations such as welding in an area located below the shroud support plate 7 by removing the access hole cover 146 if the reactor is loaded with the fuel (not shown) and the control rod guide tubes 141 in the inside.

[Fourth Embodiment]

Now, the fourth embodiment of intra-nuclear-reactor working apparatus according to the present invention will be described below. In this embodiment, the mechanism constituting members and the strength holding members of the intra-nuclear-reactor working apparatus and the working equipment are formed by using a polymeric resin material.

Specific examples of materials that can be used for this embodiment include polyamide type resins, polyimide type resins, polyether-ether-ketone resins and polyether-sulfone-resins that are excellent in terms of resistance against radioactive rays, water-absorbing property, mechanical strength and thermal resistance. All or part of these materials may be used for the above mechanism composing members and the strength holding members.

Thus, with this embodiment, it is possible to replace polymeric resin materials in place of metal materials in order to reduce the weight of the various pieces of equipment, such as an intra-nuclear-reactor working apparatus or working equipment in water. As a result, the ballast tank can be dimensionally reduced to consequently reduce the overall dimensions of the apparatus. As the apparatus is made lightweight and downsized, it can be handled easily and it can pass through narrow areas so that the reliability of operation of the apparatus is also improved.

The present invention is not limited to the above-described embodiments, which may be modified in various different ways without departing from the scope of the present invention.

For example, inspection results may be displayed on a display apparatus.

For example, while the above-described embodiments of intra-nuclear-reactor working apparatus and working method are adapted to be used in nuclear reactors, the present invention can broadly be applied various working apparatus and various working methods.

Additionally, while the above-described embodiments of working apparatus and working method are adapted to operations in water, they can be modified in various different ways as pointed out below. For example, while the operation mechanisms including the adhering/traveling modules 22 and related mechanisms may be housed in a water-tight case or the like and adapted to perform adhering/traveling operations in water, the working equipment of a working apparatus according to the present invention may be separated from them and put in air so as to operate in air. As another example, the adhering/traveling modules 22 and the thrusters 41 may be dimensionally raised to use a large drive source and a large drive mechanism for the thrusters 41 so that the thrusters 41 may acquire a sufficiently large air flow rate to produce a large adhering force in air as they are driven to rotate at high speed. With such an arrangement, a working apparatus and a working method according to the present invention may be applied to works in air.

What is claimed is:

1. A working method for doing works under an annular shroud support plate arranged substantially horizontally between an inner surface of a nuclear reactor pressure vessel and an outer surface of a shroud, the method comprising:
    conveying a working equipment with a folding/unfolding mechanism, a ballast tank, a vertical thruster and a horizontal thruster to a working position with the folding/unfolding mechanism held in a folded state, the conveying step including:
        suspending the working equipment from above the nuclear reactor pressure vessel;
        injecting water into the ballast tank to reduce buoyancy of the ballast tank;
        injecting air into the ballast tank to increase buoyancy of the ballast tank;
        thrusting the working equipment vertically by the vertical thruster for going down lower than the shroud support plate; and
        thrusting the working equipment horizontally by the horizontal thruster for going below the shroud support plate;
    unfolding the folding/unfolding mechanism and setting up the working equipment under the shroud support plate after conveying the working equipment to the working position;
    moving the set up working equipment along a lower surface of the shroud support plate and positioning the working equipment, while pressing the working equipment against the lower surface of the shroud support plate; and
    doing a work on the shroud support plate with the moved and positioned working equipment.

2. The working method of claim 1, further comprising:
    removing an access hole cover fitted to an access hole arranged at the shroud support plate, wherein
    the conveying step includes conveying the working equipment through the access hole after the cover removing step.

* * * * *